United States Patent
Dvorak

(10) Patent No.: US 6,353,732 B1
(45) Date of Patent: Mar. 5, 2002

(54) METHOD FOR AUTOMATICALLY ASSISTING UNAIDED VOICE COMMUNICATION

(75) Inventor: Joseph L. Dvorak, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/093,658

(22) Filed: Jun. 8, 1998

(51) Int. Cl.[7] .............................................. H04Q 7/20
(52) U.S. Cl. ..................... 455/67.3; 455/11.1; 455/421; 455/456; 379/388.04
(58) Field of Search ........................ 455/79, 67.3, 517, 455/575, 116, 440, 456, 421, 11.1, 13.1; 379/387, 389, 292

(56) References Cited

U.S. PATENT DOCUMENTS

| | | | | |
|---|---|---|---|---|
| 4,860,359 A | * | 8/1989 | Eicher | 455/79 |
| 5,008,954 A | * | 4/1991 | Oppendahl | 455/79 |
| 5,230,089 A | | 7/1993 | Kindinger et al. | 455/79 |
| 5,557,606 A | * | 9/1996 | Moon et al. | 455/428 |
| 5,708,970 A | * | 1/1998 | Newman et al. | 455/79 |
| 5,737,695 A | * | 4/1998 | Lagerqvist et al. | 455/79 |
| 5,768,683 A | * | 6/1998 | Mulford | 455/11.1 |
| 5,850,593 A | * | 12/1998 | Uratani | 455/11.1 |
| 5,854,845 A | * | 12/1998 | Itani | 455/234.1 |
| 5,867,574 A | * | 2/1999 | Erylimaz | 379/389 |
| 5,896,450 A | * | 4/1999 | Kurihara | 379/387 |
| 5,926,765 A | * | 7/1999 | Sasaki | 455/456 |
| 5,943,621 A | * | 8/1999 | Ho et al. | 455/456 |
| 5,950,137 A | * | 9/1999 | Kim | 455/456 |
| 5,974,329 A | * | 10/1999 | Wylie et al. | 455/456 |
| 6,141,533 A | * | 10/2000 | Wilson et al. | 455/11.1 |

* cited by examiner

*Primary Examiner*—William Trost
*Assistant Examiner*—Simon Nguyen
(74) *Attorney, Agent, or Firm*—Andrew S. Fuller; Frank M. Scutch, III

(57) ABSTRACT

Automatic assistance to unaided voice communication is provided by activating and deactivating a wireless communication link as needed (300). A communication device, associated with a particular individual, monitors to determine whether unaided communication occurring with another individual is satisfactory according to a predetermined criteria (310, 320, 330). The communication device automatically switches to provide aided communication, when the unaided communication is not satisfactory. Preferably, an open communication link is established between the communication device and one associated with the other individual when sound reception characteristics or separation characteristics do not meet a particular criteria (340, 350, 360, 370).

6 Claims, 3 Drawing Sheets

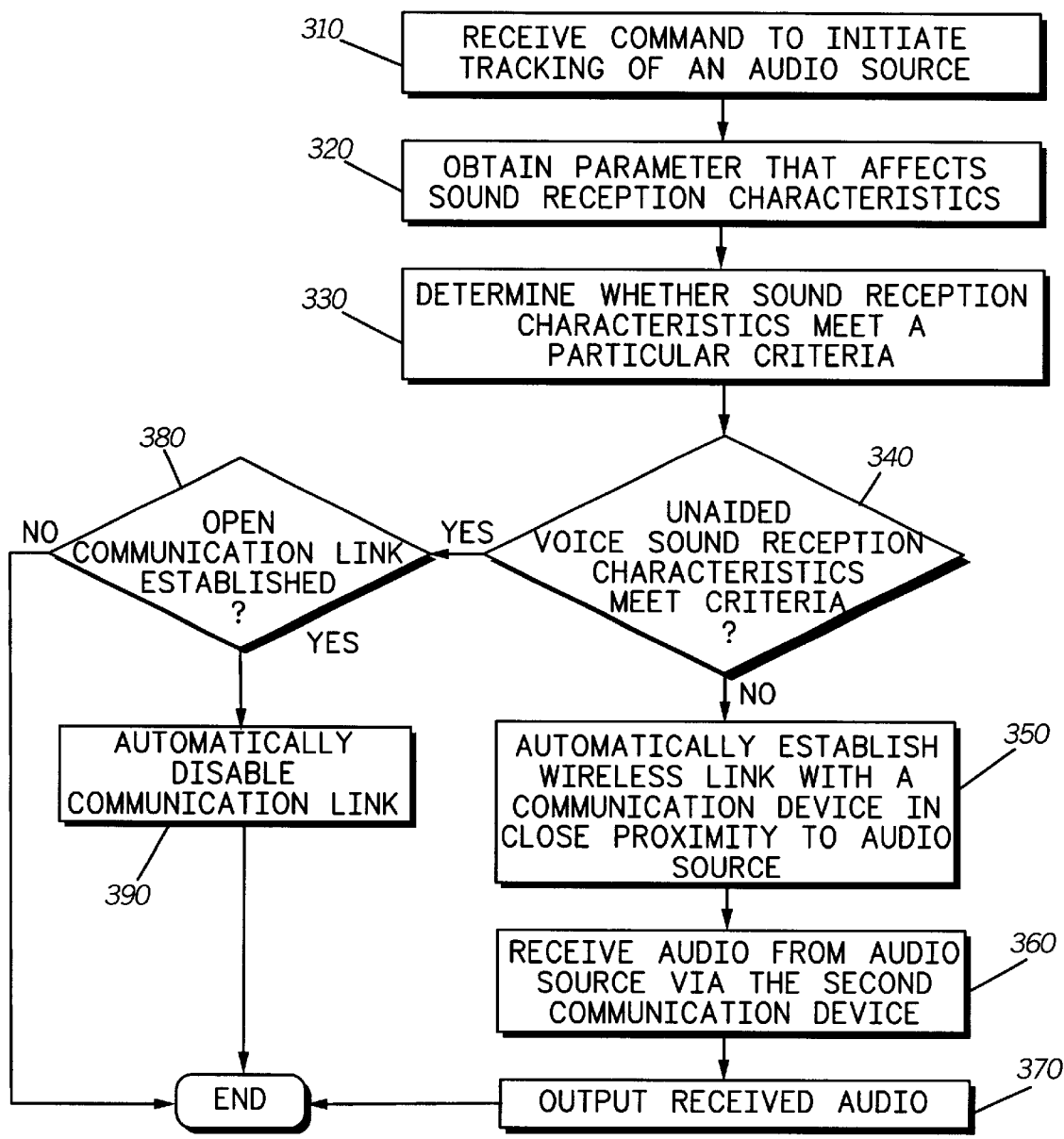

METHOD FOR AUTOMATICALLY ASSISTING UNAIDED VOICE COMMUNICATION

TECHNICAL FIELD

This invention relates in general to communication devices, and more particularly, to the automatic activation of communication devices to assist voice communications.

BACKGROUND OF THE INVENTION

Wireless communication devices are becoming an increasingly important part of everyday life. As these devices become smaller and less obtrusive, there is a desire to have more seamless integration with respect to the way people communicate. Oftentimes, the communication devices relay communication services to provide enhanced capabilities and coverage.

Communication services may be provided by public or private networks, or may occur over shared or licensed communication links. Typically, there is a cost associated with the use of such services. Accordingly, it is desirable that such services be utilized only when needed. Wireless communication services are useful for extending natural communications between individuals. However, such extension is not currently done in a seamless manner. Consequently, there exists a need to provide automatic assistance to natural communication in a transparent manner that makes efficient use of communication resources.

BRIEF DESCRIPTION OF THE DRAWINGS

FIG. 3 is a flowchart summarizing procedures for providing automatically switching between aided and unaided voice communication, in accordance with the present invention.

DETAILED DESCRIPTION OF THE PREFERRED EMBODIMENT

Figure 1:
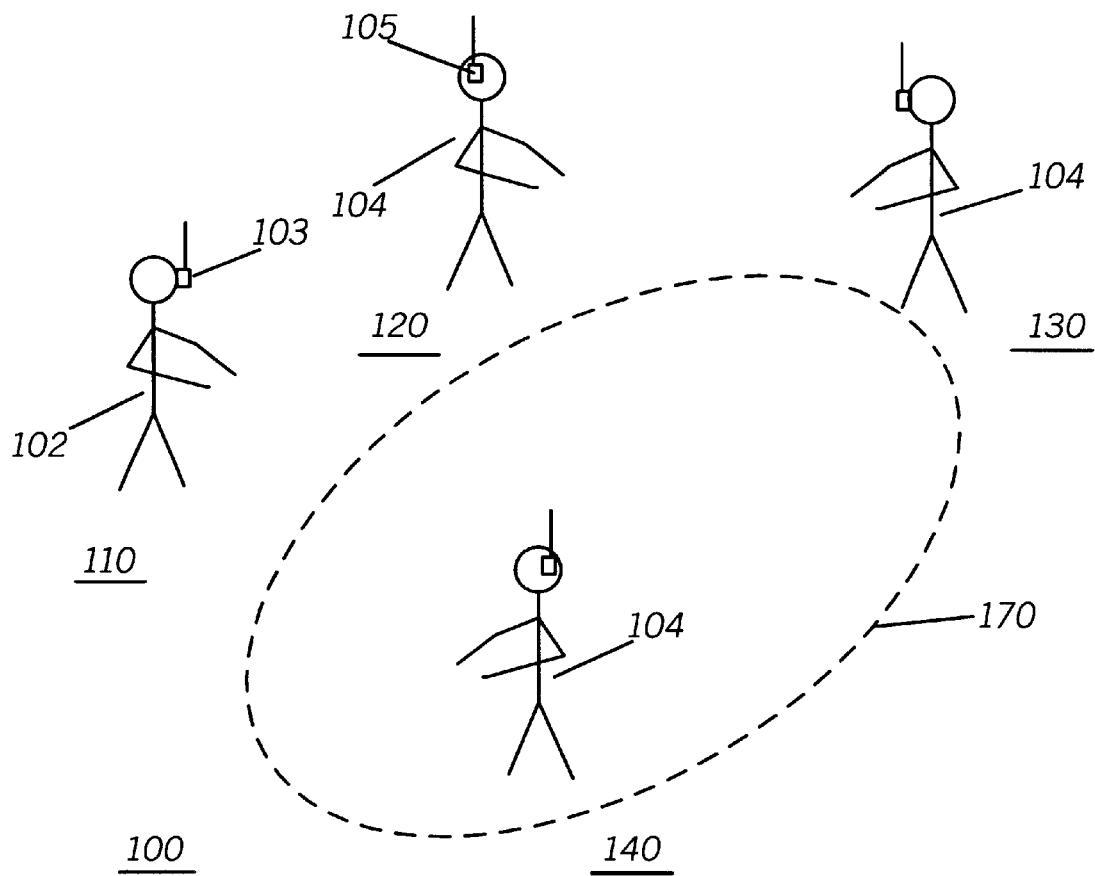
FIG. 1 is a diagram of a communication environment in which automatic assistance is provided for unaided voice communication, in accordance with the present invention.

While the specification concludes with claims defining the features of the invention that are regarded as novel, it is believed that the invention will be better understood from a consideration of the following description in conjunction with the drawing figures, in which like reference numerals are carried forward.

The present invention provides for automatic activation and deactivation of a wireless communication link in a manner suitable to provide assistance for voice communication as needed. In one embodiment, a communication device monitors to determine whether unaided communication occurring between two individuals is satisfactory according to a predetermined criteria, and automatically switches to provide aided communication, when the unaided communication is not satisfactory according to the predetermined criteria. This is done by automatically establishing a wireless communication link between communication devices associated with the two individuals without any action on the part of the individuals. In the preferred embodiment, the communication device obtains at least one parameter that affects sound reception characteristics for unaided voice communication from a particular source. When based on the at least one parameter the sound reception characteristics do not meet the particular criteria, the communication device automatically establishes a wireless communication link with another communication device situated in close proximity to the particular source, receives voice communication from the particular source via the second communication device, and outputs audio representing the voice communication received.

FIG. 1 depicts a communication environment 100 in which wireless communication is provided as needed, in accordance with the present invention. A fist individual 102 at a particular location 110 engages in a conversation with, second indivdual 104 initially located at location 120 in an unaided manner, i.e., there is direct voice communication therebetween without the aid of an intervening communication device. As the second individual moves along a path 170, that individual transitions from location 120 to location 130 and then to location 140. At location 130, the second individual is at some distance from the first individual such that unaided voice communication is no longer possible or practicable. At location 140, the second individual is again back within suitable range for unaided voice communication.

According to the present invention, communication devices 103, 105 are associated with both individuals 102, 104 to automatically assist in voice communications as needed, i.e., when the separation or voice reception characteristics are such that unaided voice communication is not comfortable or practicable. In the communication environment 100 as depicted, this is the case when the second individual is situated at location 130. In such cases, a wireless communication link is automatically opened between the communication devices 103, 105 and voice communication between the individuals is routed through the open communication link. Preferably, this link is automatically terminated when the separation or voice reception characteristics are such that aided voice communication is no longer necessary.

Figure 2:
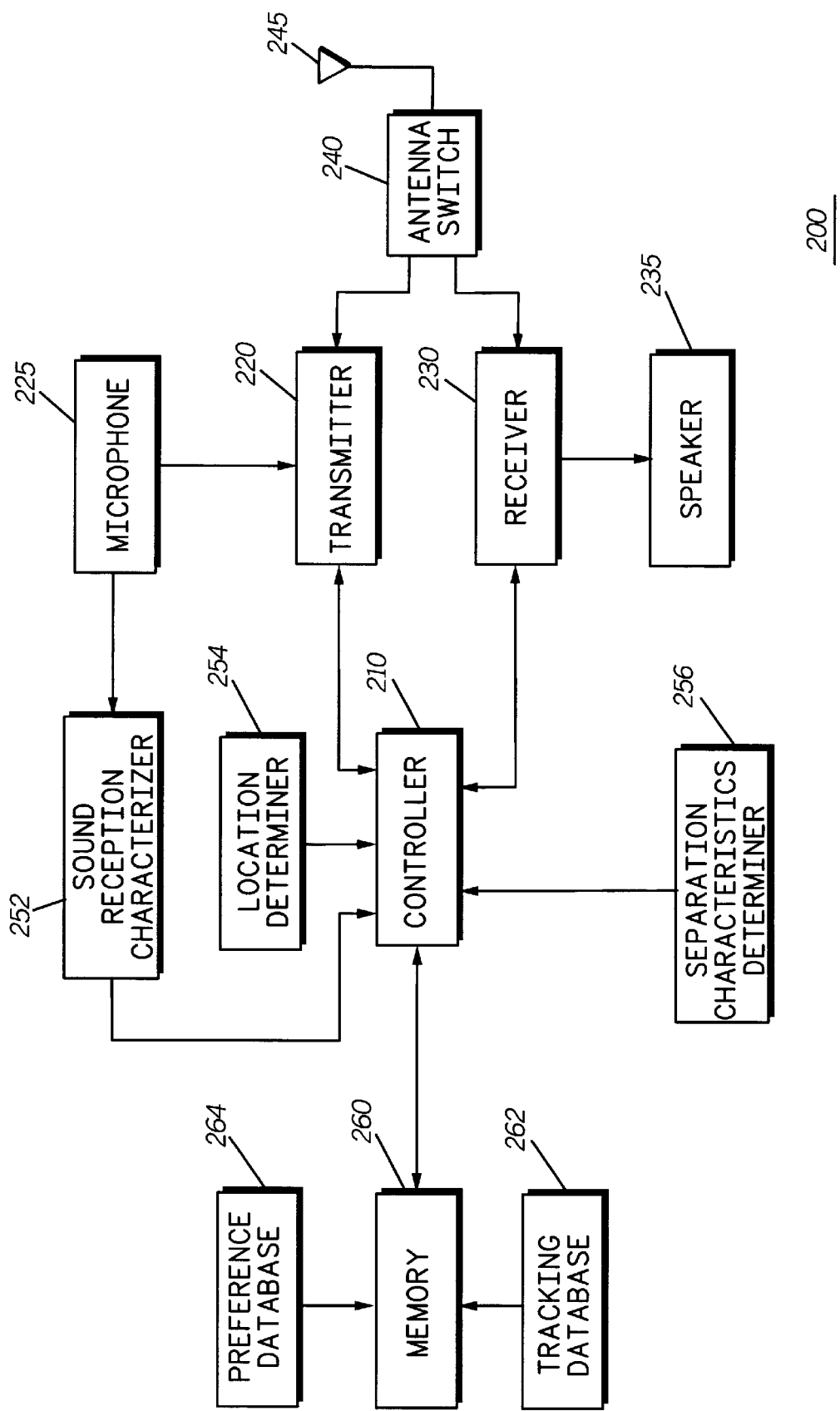
FIG. 2 is a block diagram of a radio communication device, in accordance with the present invention.

FIG. 2 is a block diagram of a radio communication device 200, in accordance with the present invention. The communication devices 103, 105 referred to in FIG. 1 are similarly constructed. The communication device 200 is a two-way radio capable of communicating using wireless radio frequency signals. The radio 200 includes a controller 210 that is coupled to a memory 260, to a transmitter 220, and to a receiver 230, that together provide communication circuitry. The transmitter 220 and the receiver 230 are coupled, via an antenna switch 240, to an antenna 245. For transmit operations, the controller 210 configures the antenna switch 240 to couple the transmitter 220 to the antenna 245. Similarly, for receive operations, the controller 210 operates the receiver 230 to process signals obtained via the antenna 245. Receive and transmit operations are conducted under instructions stored in the memory 260. A microphone 225 and speaker 235 support audio input into and audio output from the radio 200.

In accordance with the present invention, the radio 200 also includes functional blocks to support the automatic establishment of a communication link to assist in voice communication. Particularly, a tracking database 262 stores one or more parameters for managing tracking of audio sources or potential communicants for which automatic voice communication assistance may be triggered. These parameters include location information. A preference database 264 stores various established criteria and thresholds used in the triggering process. For the purposes of determining when to trigger automatic assistance, a sound reception characterizer 252 is coupled to the microphone 225, and functions to determine sound reception characteristics based on at least one parameter. One such parameter is the sound level of the unaided voice communication received. When the sound level is below a particular threshold, it is determined that the sound reception characteristics do not meet an established criteria. Sound reception characteristics are also determined based on voice intelligibility which is estimated by the noise content of the received audio input from the microphone 225. Here, it is determined that the sound reception characteristics do not meet an established criteria when the noise content is above a particular threshold.

The ability to communicate via voice in an unaided manner is also assumed to depend on the separation characteristics between communicants. Accordingly, the radio 200 includes a separation characterizer 256 that, in the preferred embodiment, is based on the estimated distance between communicants. A location determiner 254 provides to determine the current location of the radio. This information is sometimes transmitted by the radio 200 to facilitate the assessment of the separation characteristics. Location information received from a participating communicant is compared with location information derived for the radio 200 in order to establish a separation distance between communicants. When the separation distance is greater than a particular threshold, then the separation characteristics are deemed not to meet an established criteria. One skilled in the art would readily appreciate the separation distances and location information can be determined in a variety of ways, including use of external tracking systems, local and global positioning systems, triangulation techniques, and the like.

FIG. 3 shows a flowchart 300 summarizing procedures for providing automatic assistance to unaided voice communication, in accordance with the present invention. As described with respect to FIG. 1, entities, such as individuals or other communicants, utilize an associated communication device to provide automatic assistance for voice or audio communication on an as needed basis. For the purposes of clarity, the procedure for providing automatic assistance is described with respect to a first communication device associated with a first individual, and a second communication device associated with a second individual or audio source. The first individual issues a command to the first communication device to track an entity that is associated with or that is in close proximity to the second communication device. Thus, the communication device receives a command to initiate tracking of an entity or audio source, step 310. In response, the first communication device preferably communicates with the second communication device to request and obtain permission for tracking the second communication device or the entity associated therewith. The first communication device then monitors to determine whether unaided communication occurring between two individuals is satisfactory according to a predetermined criteria. In one embodiment, the first communication device obtains one or more parameters that affect sound reception characteristics for the unaided voice communication received, step 320. The parameters include a sound level value, an estimate of voice quality, and an estimate of voice intelligibility, using the amplitude and noise content for signals sourced by the microphone. In another embodiment, the potential for adequate sound reception is based on separation distance and/or other separation characteristics. To obtain separation distance information, location information is obtained for the first and second communication devices, and consequently the individuals or communicants, which are assumed to be physically associated with the first and second communication devices. Preferably, the first communication device receives the second communication device information pertaining to its current location. Upon obtaining location information for the communication devices, the separation distance can be calculated. In yet another embodiment, the rate of change of distance between the communication devices is determined. Thus, the sound reception characteristics is determinable from a number of parameters including parameters that indicate separation characteristics.

The first communication device then determines whether the sound reception characteristics meet a particular criteria, step 330. For example, the sound reception characteristics may not meet the criteria if the estimate of voice quality or the sound level value is below a particular threshold, or the voice intelligibility does not meet a particular criteria. Similarly, the criteria may not be met if the separation characteristics are such that the separation distance is greater than a particular threshold.

When the particular criteria is not met, step 340, the first communication device automatically establishes a radio frequency or other wireless communication link with the second communication device, step 350. Voice communication sourced from one individual, i.e., the audio source, is automatically received, via the communication link established with the second communication device, and this received audio outputted or otherwise presented, steps 360, 370. Hence, there is automatic switching from unaided communication to aided communication by establishing an open communication link between communication devices associated with the two individuals, when the unaided communication is not satisfactory according to the predetermined, criteria.

While receiving and presenting the aided voice communication via the second communication device, the first communication device determines characteristics relating to sound reception for the unaided voice communication sourced from the individual. If the sound reception characteristics criteria for unaided communication are again met during the aided communication, the open communication link with the second communication device is automatically disabled, and the assistance terminated, steps 340, 380, 390. This can occur when the separation characteristics meet a certain criteria, or other criteria such as voice quality, voice intelligibility, rate of change of separation, or other similar measure of sound reception characteristics is met.

The present invention provides for significant advantages over the prior art. By providing automatic assistance, as needed, to natural voice communication in a seamless manner, integrated personal communications is further enhanced. Furthermore, efficient use is made of communication resources as such assistance is automatically disabled when no longer needed.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a first communication device, a method for automatically assisting unaided voice communication, where unaided voice communication refers to direct voice communication received from a particular source without the aid of an intervening communication device, the method comprising the steps of:

obtaining at least one parameter that affects sound reception characteristics with respect to unaided voice communication received from the particular source, including the step of obtaining an estimate of distance between the first communication device and a second communication device; and determining whether based on the at least one parameter the sound reception characteristics meet a particular criteria, including the step of establishing that the sound reception characteristics do not meet the particular criteria when the estimate of distance exceeds a particular threshold;

when based on the at least one parameter the sound reception characteristics do not meet the particular criteria, automatically:
  establishing a wireless communication link with a second communication device situated in close proximity to the particular source;
  receiving voice communication from the particular source via the second communication device; and
  outputting audio representing the voice communication received.

2. In a system having first and second communication devices, a method, comprising the steps of:

at the first communication device:
  (a) receiving a request to initiate tracking an entity associated with the second communication device;
  (b) receiving location information pertaining to the second communication device;
  (c) determining separation characteristics between the first communication device and the second communication device based upon sound reception criteria of unaided voice communication; and
  (d) automatically establishing an wireless communication link between the first communication device and the second communication device when the separation characteristics meet a first criteria.

3. The method of claim 2, further comprising, after step (a) and before step (b), the steps of:

sending a request for permission to track to the second communication device; and obtaining permission to track from the second communication device in response to the request.

4. The method of claim 2, further comprising, after step (d), the step of,
  (e) automatically terminating the wireless communication link between the first communication device and the second communication device when the separation characteristics meet a second criteria.

5. The method of claim 4, wherein:

step (d) comprises the step of determining that the separation characteristics meet the first criteria when the first and second communication devices have a separation distance greater than a particular threshold; and step (e) comprises the step of determining that the separation characteristics meet the second criteria when the first and second communication devices have a separation distance less than the particular threshold.

6. The method of claim 2, wherein step (b) further comprises the step of receiving the location information from the second communication device.

* * * * *